May 4, 1965 R. E. SAYLES 3,181,406
SHARPENING MECHANISM FOR RECIPROCATING ROTATABLE CUTTER
Filed April 22, 1963 2 Sheets-Sheet 1
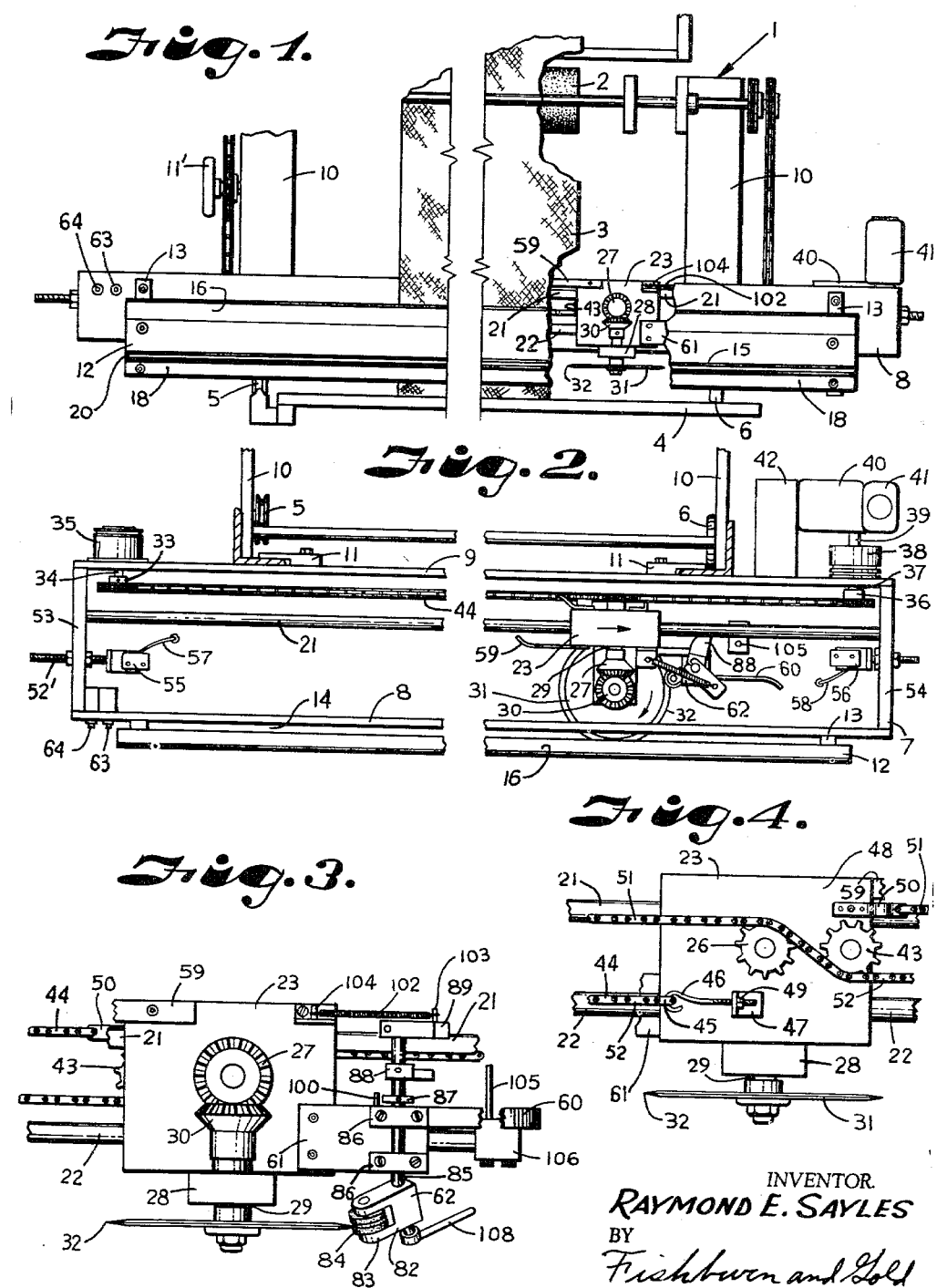
INVENTOR.
RAYMOND E. SAYLES
BY
Fishburn and Gold
ATTORNEYS May 4, 1965  R. E. SAYLES  3,181,406
SHARPENING MECHANISM FOR RECIPROCATING ROTATABLE CUTTER
Filed April 22, 1963  2 Sheets-Sheet 2
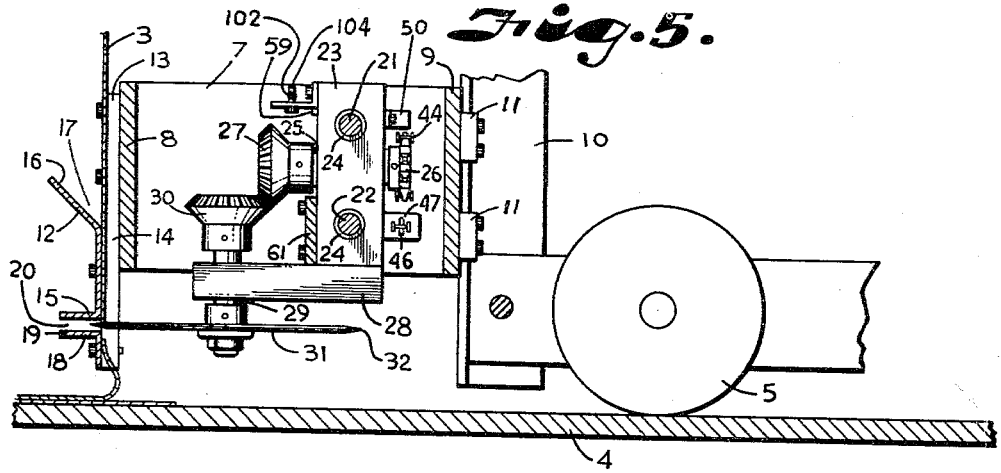
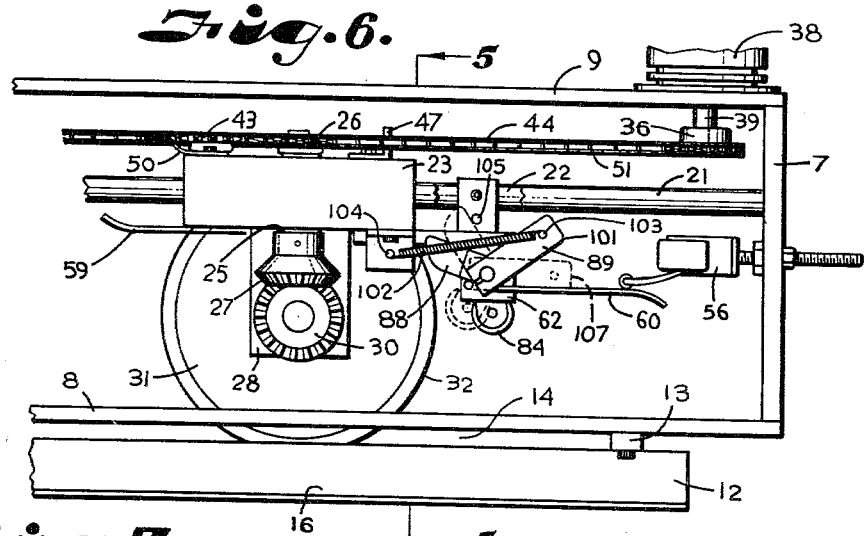
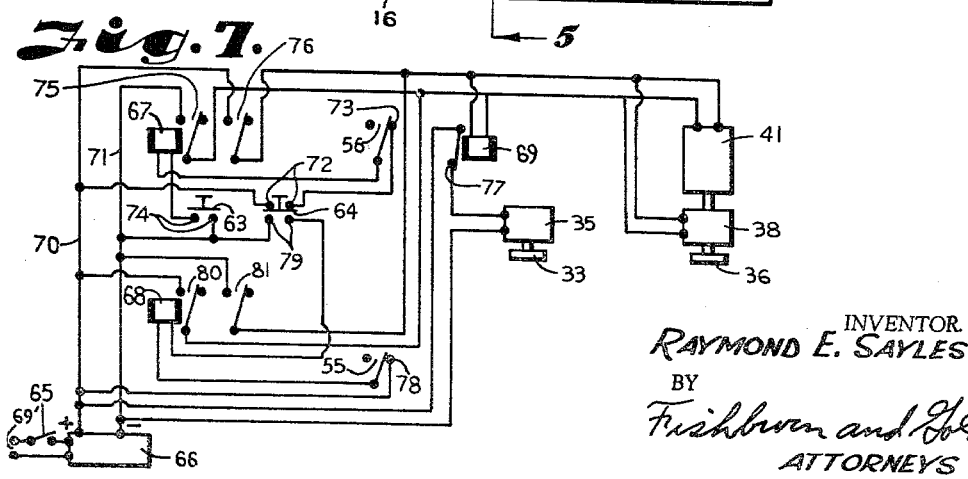
INVENTOR.
RAYMOND E. SAYLES
BY
Fishburn and Gold
ATTORNEYS

United States Patent Office 3,181,406
Patented May 4, 1965

3,181,406
SHARPENING MECHANISM FOR RECIPROCATING ROTATABLE CUTTER
Raymond E. Sayles, Kansas City, Mo., assignor to Pennway Garment Company, Kansas City, Mo., a corporation of Missouri
Filed Apr. 22, 1963, Ser. No. 274,439
3 Claims. (Cl. 83—174)

This invention relates to improvements in cutting devices and more particularly cutting devices of the type using a reciprocable rotatable cutter disc.

The principal objects of the present invention are: to provide an improved cutting device adapted for use on fabric spreading machines and the like; to provide such a device which operates smoothly and quickly with minimum power input; to provide a cutting mechanism which includes a reciprocable carriage rotatably supporting a cutter disc and including a sharpening device which may be selectively actuated for sharpening the disc during a pass, the sharpening device then automatically disengaging from the disc until again actuated; to provide such a cutting mechanism which automatically stops at the end of each transverse pass in position for a new cutting cycle; to provide such a cutting mechanism wherein simple, rugged, interrelated parts produce cutter disc rotation along with disc carriage reciprocation; to provide such mechanism which operates efficiently at high speed without the inertial strain normally expected in such devices due to automatically synchronized clutch and brake drive systems associated therewith; and to provide such a cutting mechanism which is inexpensive in construction and easily maintained over long periods of constant use.

Other objects and advantages of this invention will become apparent from the following description taken in connection with the accompanying drawings wherein are set forth by way of illustration and example certain embodiments of this invention.

FIG. 1 is a fragmentary front elevational view of a cloth or fabric spreading machine with parts broken away revealing a cutting mechanism embodying this invention.

FIG. 2 is a fragmentary top view of the cloth spreading machine of FIG. 1 particularly showing the cutting mechanism laterally traversing while engaged with a cutter disc sharpening device.

FIG. 3 is a fragmentary front elevation on an enlarged scale showing details of the cutter disc carriage and sharpening device.

FIG. 4 is a fragmentary rear elevation on an enlarged scale of the cutter disc carriage showing the relationship between the carriage drive chain and cutter disc rotating members.

FIG. 5 is a cross-sectional side elevation on an enlarged scale through the cutting mechanism taken on the line 5—5, FIG. 6, particularly showing the cutter disc contacting the fabric.

FIG. 6 is a fragmentary top view on an enlarged scale particularly showing the mechanism for producing an over-center action in disengaging the cutter disc sharpening device.

FIG. 7 is a schematic electrical wiring diagram illustrating the electrical control relationship between the cutting mechanism parts.

Referring to the drawings in more detail:

The reference numeral 1 generally indicates a cloth or fabric spreading apparatus of the type disclosed in my co-pending patent application Serial No. 248,763, filed December 31, 1962 entitled "Cloth Spreading Apparatus." The apparatus 1 includes a cloth driving roll 2 adapted for urging cloth or fabric 3 from a roll thereof (not shown) onto a table 4 at exactly the same speed that the spreading apparatus 1 is driven over the table 4 on wheels 5 and 6. The apparatus 1 includes a forwardly extending horizontally elongated frame portion 7 having spaced apart parallel transverse front and rear bars 8 and 9. The frame portion 7 is supported on the body frame 10 of the cloth spreading apparatus by means of suitable guide brackets 11 which permit vertical adjustment of the frame portion 7 by a hand wheel and chain 11' so as to vary in height above the table 4.

An elongated transversely extending sheet metal member 12 is spaced forwardly of but secured to the front bar 8 by means of suitable spaced apart spacer brackets 13. The member 12 forms with the front bar 8 a transversely and vertically extending passageway 14 for receiving and guiding the depending cloth or fabric 3 to be spread on the table 4. The sheet member 12 has a lower lip 15 extending horizontally forwardly therefrom and an upper lip 16 extending obliquely upwardly forming a funnel portion 17 with the front bar 8 for ease of initially threading the fabric 3 into the passageway 14. An angle member 18 is secured by the brackets 13 in transversely extending position beneath the member 12 and has a horizontally extending leg 19 spaced downwardly from the lower lip 15 forming a horizontally open slot 20 therebetween which transversely communicates with the passageway 14.

Upper and lower spaced apart parallel guide rods 21 and 22 respectively are fixed at opposite ends thereof to the frame portion 7 and extend between and parallel to the front and rear bars 8 and 9. A cutter disc carriage 23 has transversely extending upper and lower rod receiving bearing members 24 therein preferably but not necessarily of the axial-motion ball bearing type. The bearing members 24 respectively receive the guide rods 21 and 22 therethrough and slidably support the carriage 23 for accurate transverse reciprocal motion within the frame portion 7.

A horizontal shaft 25 is rotatably mounted in the carriage 23 and extends forwardly and rearwardly thereof. The shaft 25 has a motion transmitting member or chain sprocket 26 fixed thereon at the rear of the carriage 23 and a bevel gear 27 fixed thereon at front of the carriage. A bearing block 28 is suitably secured at the bottom of the carriage 23 and extends forwardly thereof. The bearing block 28 has a vertically extending shaft 29 rotatably mounted thereon and supporting at the upper end thereof a bevel gear 30 meshing with the bevel gear 27. The lower end of the shaft 29 has a cutter disc 31 fixed thereto for rotation in a horizontal plane. The cutter disc 31 is located at a level and in a position whereby the cutting edge or periphery 32 thereof extends past the passageway 14 and a small distance into the horizontal slot 20 so as to positively contact fabric 3 extending downwardly through the passageway 14.

A sprocket 33 is mounted on a shaft 34 extending through the rear bar 9 adjacent one end thereof. The shaft 34 is rotatably supported in a magnetic brake member 35 mounted on the bar 9 and which may be selectively actuated by electrical means described hereinafter for freeing or retarding the rotation of the sprocket 33. A sprocket 36 is mounted on a shaft 37 extending through the rear bar 9 at a position aligned with but at the opposite end from the position of the shaft 34. The shaft 37 extends into and is operably engaged with a magnetic clutch member 38 mounted on the bar 9 and which is actuated by electrical means described hereinafter to selectively couple and uncouple a drive shaft 39 extending from a gear reducer 40 driven by a motor 41. The gear reducer 40 and motor 41 are mounted on the rear bar 9 by means of a suitable box-bracket 42 which also forms a container for electrical power supply and control members described hereinafter.

Extending rearwardly of and rotatably mounted on the carriage 23 is an idler sprocket 43 horizontally displaced from the sprocket 26. An elongated flexible power transmitting member, in the illustrated example sprocket chain 44, has one end 45 thereof anchored by means of a threaded hook 46 to a bracket 47 fixed to the rear surface 48 of the carriage 23 at a level below the sprocket 26. A nut 49 is threadedly engaged with the hook 46 and bears against the bracket 47 for adjusting the tautness of the chain 44 against anchoring means noted below. The chain is threaded under and over the sprocket 36 and doubled back to engage first the upper teeth of the sprocket 26 and then deflect downwardly engaging the lower teeth of the sprocket 43. The chain 44 continues upwardly around the sprocket 33, again doubling back and finally being anchored to the carriage rear surface 48 by means of a bracket 50 spaced above the sprocket 43. The sprocket 43, cooperating with the sprockets 26, 33 and 36, directs the chain in upper and lower substantially parallel flights 51 and 52 respectively extending transversely within the frame portion 7 adjacent the respective guide rods 21 and 22. The rotation of the sprocket 36 by the motor 41 (in either direction) results in a transverse motion of the carriage 23 along the guide rods 21 and 22 while simultaneously causing the rotation of the cutter disc 31 through engagement of the chain with the sprocket 26.

Mounted by adjusting screws 52' on opposite end walls 53 and 54 of the frame portion 7 are switches 55 and 56. The switches 55 and 56 have respective actuating arms 57 and 58 located at opposite ends of the carriage 23 path of travel. Cam fingers respectively designated 59 and 60 are fixed with espect to the carriage 23 and extend in opposite lateral directions therefrom in alignment with the switch actuating arms 57 and 58 for actuating the switches 55 and 56 at opposite ends of the carriage path of travel. The cam finger 60 is mounted on the carriage 23 by means of a bracket 61 which also swingably supports a cutter disc sharpening mechanism 62 described hereinafter. Push-button switches 63 and 64 are mounted in a convenient position on the front bar 8 adjacent one end thereof for operator manipulation.

Referring to FIG. 7, the relationship between electrical controls of the apparatus is depicted. Such controls include a master switch 65, a D.C. current output rectifier 66, double pole relays 67 and 68 and a single pole relay 69. A house power source 69' feeds the rectifier 66 through the master switch 65 which produces a D.C. output in lines 70 and 71. The actuating coil of the relay 67 is fed through normally closed contacts 72 of the push-button switch 64 and also through normally closed contacts 73 of the end-of-travel switch 56. Also in series with the coil of the relay 67 are normally open contacts 74 of the push-button 63. The actuation of the relay 67 closes normally open contacts 75 and 76 which actuates the motor 41 and clutch member 38 to rotate the sprocket 36 in a predetermined direction while simultaneously deactuating the brake member 35 through actuation of the single pole relay 69 which opens the normally closed contacts 77 thereof.

The coil of the relay 68 is fed through the normally closed contacts 78 of the end-of-travel switch 55 and also through the normally open contacts 79 of the push button switch 64. The actuation of the relay 68 causes the normally open contacts 80 and 81 thereof to close which causes current to flow into the motor 41 with opposite polarity from that directed by the relay 67 producing a reversal in the driven direction of the sprocket 36 while actuating the clutch member 38 and deactuating the brake member 35 in the same manner.

In operation, the push-button switch 64 is depressed which prevents closure of the contacts 75 and 76 while causing closure of the contacts 80 and 81. The closure of the contacts 80 and 81 causes release of the brake member 35 and actuation of the motor 41 and clutch member 38 which drives the sprocket 36 in a direction causing the carriage 23 to approach the switch 55. When the cam finger 59 causes actuation of the switch 55 (opening the contacts 78) the contacts 80 and 81 open which produces an actuation of the brake member 35 immediately stopping the carriage while deactuating the motor 41 and clutch member 38. The deactuation of the latter permits the built-up inertia of the motor to be expended freely over a considerable period of time rather than producing a heavy shock load on the chain 44 and associated structure as the brake member 35 is actuated.

The carriage 23 rests adjacent the switch 55 until the push-button switch 63 is depressed which causes actuation of the relay 67, closing the contacts 75 and 76 resulting in the driving of the motor 41 in the opposite direction until the carriage cam finger 60 actuates the switch 56. This again causes braking of the carriage while permitting gradual inertia dissipation in the motor 41. The interlocking electrical relationship between the push-buttons 63 and 64 prevents the contacts 75 and 76 to be closed at the same time as the contacts 80 and 81, which would produce a short circuit. Thus, a cutting pass may initiate at either end of the carriage path of travel.

The sharpening mechanism 62, noted above, comprises a bracket 82 having vertically spaced apart slightly downwardly and outwardly sloping legs 83 rotatably supporting opposed grinding wheels 84 therebetween. The bracket 82 is mounted for swinging or pivoting on a shaft 85 rotatably supported on the bracket 61 by means of vertically spaced bearing members 86. The shaft 85 extends above the bracket 61 and supports a stop member 87, a cam member 88 and an over-center arm 89 spaced upwardly thereon. A pin 100 is fixed with respect to the bracket 61 and limits the rotation or pivoting of the bracket 82 to the counterclockwise limit rest position illustrated at 101, FIG. 6.

A tension spring 102 is secured at one end thereof to a pin 103 on the over-center arm 89 and at the other end thereof is anchored to a pin 104 fixed with respect to the carriage 23. The over-center arm 89 extends outwardly from the top of the shaft 85 in a direction which produces cooperation with the spring 102 to either urge the grinding wheels 84 resiliently against the periphery 32 of the cutter disc or into a rest position 101 noted above wherein the grinding wheels 84 are spaced away from the periphery 32. When the grinding wheels 84 are being held against the periphery 32 the cam member 88 extends rearwardly as illustrated in FIG. 2 so as to be in a path of travel which intersects an upstanding stop or pin 105. The pin 105 is secured by means of a clamp 106 to the lower guide rod 22 and is adjustable in position therealong. When the cam member 88 strikes the stationary pin 105 the shaft 85 is rotated until the spring 102 is able to pull the over-center arm 89 to the position illustrated at 101, FIG. 6. The position of the pin 105 is located along the guide rod 22 so that the cam member 88 pulls the over-center arm 89 past the dead center position indicated by the broken lines 107 to insure the complete rotation of the stop member 87 against the pin 100 by the spring 102.

A handle 108 is fixed to the grinding wheel supporting bracket 82 for manually swinging or pivoting the grinding wheels from the position indicated in FIG. 6 to a position adjacent the periphery 32 (FIGS. 2 and 3) whereupon the spring 102 maintains the grinding wheels against the periphery 32 under the proper pressure. By way of operation, the handle 108 is rotated to place the grinding wheels against the periphery 32 when the carriage 23 is stationary adjacent the switch 55. The push-button 63 is then pressed and, if desired, fabric may be severed simultaneously as the periphery 32 is being sharpened. The carriage 23 travels toward the switch 53 and the grinding wheels 84 rotate against the periphery 32 sharpening same to a fine razor edge. Upon striking the pin 105, the cam member 88 rotates the sharpening mechanism 62 away from contact with the periphery 32 where it remains in the position indicated in FIG. 6 until it is determined that further sharpening is required.

It is to be understood that while one form of this invention has been illustrated and described it is not to be limited to the specific form or arrangement of parts herein described and shown except insofar as such limitations are included in the claims.

What I claim and desire to secure by Letters Patent is:

1. In a cutting mechanism having a frame and a reciprocable carriage with a rotatable cutter disc thereon, a sharpening mechanism for said disc comprising: a bracket movably supported on said carriage and carrying a contact sharpening member in a path selectively intersecting the periphery of said cutter disc, resilient means cooperating between said carriage and said bracket for selectively urging said sharpening member into contact with said periphery, and stop means on said frame and adapted to cooperate with said bracket for moving said sharpening member away from said periphery during a carriage reciprocation.

2. The apparatus as set forth in claim 1 wherein said resilient means is an over-center device for selectively urging said sharpening member into contact with said periphery and away from said periphery.

3. In a cutting mechanism having a frame and a reciprocable carriage with a rotatable cutter disc thereon, a sharpening mechanism for said disc comprising: a shaft pivotally mounted on said carriage, a bracket fixed to said shaft and swingably supporting a contact sharpening member in a path intersecting the periphery of said cutter disc, a cam member on said shaft and moving in a path with said carriage, a stop fixed with respect to said frame and extending in the path of said cam member, an over-center member fixed to said shaft, and a resilient member cooperating between said over-center member and said carriage for resiliently urging said sharpening member against said periphery when said over-center member is on one side of a center position and urging said sharpening member away from said cutter disc when said over-center member is on the other side of the center position, said cam member rotating said over-center member through the center position upon engaging said stop during a reciprocation of said carriage with said sharpening member contacting said cutter disc.

References Cited by the Examiner

UNITED STATES PATENTS

| 1,047,429 | 12/12 | Meyer | 51—247 |
| 1,795,781 | 3/31 | Komow | 83—174 |
| 1,812,406 | 6/31 | Jenkins | 83—174 |
| 1,968,664 | 7/34 | Van Berkel | 51—248 |
| 2,627,922 | 2/53 | Teall | 83—174 |
| 2,708,969 | 5/55 | Kopelowicz | 83—174 |
| 2,722,731 | 11/55 | Le Tarte | 83—488 |
| 2,946,251 | 7/60 | Engel | 83—488 |

ANDREW R. JUHASZ, *Primary Examiner.*